(12) United States Patent
Ding et al.

(10) Patent No.: US 8,565,482 B2
(45) Date of Patent: Oct. 22, 2013

(54) LOCAL DIFFERENCE PATTERN BASED LOCAL BACKGROUND MODELING FOR OBJECT DETECTION

(75) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 13/198,382

(22) Filed: Aug. 4, 2011

(65) Prior Publication Data

US 2012/0219224 A1    Aug. 30, 2012

Related U.S. Application Data

(60) Provisional application No. 61/447,570, filed on Feb. 28, 2011.

(51) Int. Cl.
*G06K 9/46* (2006.01)
*G06K 9/62* (2006.01)

(52) U.S. Cl.
USPC ........... 382/103; 382/159; 382/195; 382/224; 382/225

(58) Field of Classification Search
USPC .................. 382/103, 159, 195, 224, 225
See application file for complete search history.

(56) References Cited

U.S. PATENT DOCUMENTS

| | | | |
|---|---|---|---|
| 7,454,067 B1 * | 11/2008 | Pati | 382/225 |
| 8,355,576 B2 * | 1/2013 | Tu et al. | 382/173 |
| 2004/0013304 A1 * | 1/2004 | Viola et al. | 382/224 |
| 2008/0025568 A1 * | 1/2008 | Han et al. | 382/103 |
| 2008/0085060 A1 * | 4/2008 | Bosco et al. | 382/264 |
| 2008/0292192 A1 | 11/2008 | Seki | |
| 2009/0110299 A1 * | 4/2009 | Panahpour Tehrani et al. | 382/224 |
| 2011/0116682 A1 * | 5/2011 | Wang et al. | 382/103 |
| 2011/0243459 A1 * | 10/2011 | Deng | 382/218 |

OTHER PUBLICATIONS

Zhou, J., et al., "Real Time Robust Human Detection and Tracking System", 2005 IEEE Computer Society Conference on Computer Vision and Pattern Recognition Workshop.
Aviram, G., et al., "Evaluating TNO Human Target Detection Experimental Results Agreement with Various Image Metrics" RTO SCI Workshop on Search and Target Acquisition, Netherlands, Jun. 21-23, 1999.

* cited by examiner

*Primary Examiner* — Jon Chang (57) ABSTRACT

Systems and methods for object detection that consider background information are presented. Embodiments of the present invention utilizing a feature called Local Difference Pattern (LDP), which is more discriminative for modeling local background image features. In embodiments, the LDP feature is used to train detection models. In embodiments, the LDP feature may be used in detection to differentiate different image background conditions and adaptively adjust classification to yield higher detection rates.

20 Claims, 9 Drawing Sheets

Prior Art

Without LDP
(705)

With LDP
(710)

Without LDP
(715)

With LDP
(720)

LOCAL DIFFERENCE PATTERN BASED LOCAL BACKGROUND MODELING FOR OBJECT DETECTION

CROSS-REFERENCE TO RELATED APPLICATION

This application claims the priority benefit under 35 USC §119(e) to commonly assigned and co-pending U.S. Patent Application No. 61/447,570, filed on Feb. 28, 2011, entitled "CONTEXTUAL BOOST FOR PEDESTRIAN DETECTION", and listing as inventors Yuanyuan Ding and Jing Xiao. The aforementioned patent application is incorporated by reference herein in its entirety.

BACKGROUND

1. Field of Invention

The present patent document is directed towards systems and methods for object detection. More particularly, the present patent document is directed towards systems and methods that consider background when generating and using object detection models.

2. Description of the Related Art

Human detection from images can be important to many applications, such as surveillance, robotics, and automotive safety. However, human detection, indeed any type of object detection, is among the most challenging vision tasks due in part to the great variety in appearance and shape of human figures, highly cluttered environments, and often low resolution and low quality image sources.

Predominant approaches for human detection usually scan the input images with sliding windows at various scales to identify the locations and scales of the contained human figures. To determine whether a local window includes a human figure, both generative and discriminative approaches have been developed. The generative approaches typically infer the posterior probability for pedestrian (human) class using discrete or continuous shape models, or combining shape and texture models. The discriminative approaches extract image features in the local window and construct classifiers for detection. For this purpose, various features have been proposed, such as Haar wavelet features, gradient-based features, shape-based features, combination of multiple features, automatically mined features, or pose-invariant features. The local features are then used to identify humans in the classification process by algorithms such as AdaBoost or support vector machine (SVM). This process typically has been either targeted at the human figure as one object or is based on parts detectors. The parts-based methods treat the human figure as an assembly of different body parts. Individual parts are detected and the results combined to achieve classification on the whole human figure.

It must be noted, however, that these methods only utilize the information inside a human region. That is, these detection methods seek to detect the object without taking into account the neighborhood context. A significant issue is that the input images are often captured under different conditions, such as different levels of exposure, different ISO settings, different backgrounds, and the like. The varying contrast levels in the input image create challenging difficulties for detection systems.

Accordingly, systems and methods are needed that can address the challenges presented by varying backgrounds when trying to detect an object or item in an image.

SUMMARY OF INVENTION

The present invention includes systems and methods for generating detection models that consider background information and for using detection models that consider background information. Embodiments of the present invention utilizing a feature called Local Difference Pattern (LDP), which is much more discriminating for modeling local background image features. In embodiments, the LDP feature is used to train detection models. In embodiments, the LDP feature is also used in detection algorithms that are able to differentiate different image background conditions and adaptively adjust the classification algorithm to yield higher detection rates. Detection of humans are used herein for illustration purposes only and shall not limit application of the present invention; one skilled in the art shall recognize that the present disclosure may be used or adapted for use in detecting other items.

In embodiments, a computer-implemented method for training a detection system for detecting an object in an image comprises obtaining image patches and ground truth data about the image patches. A local difference pattern is calculated for each of the image patches, and the local difference patterns are clustered into a set of clusters. The image patches associated with a cluster and the ground truth/labels associated with those image patches are used to train a classifier for that cluster.

In embodiments, a local difference pattern is obtained by partitioning the candidate patch, which candidate patch may comprise the image patch and a context region that is at least partially from the image, into blocks or regions. A brightness value, such as average brightness, is calculated for at least some of the blocks, and difference values between the brightness of a reference portion and the brightness of at least some of the blocks. In embodiment, the reference portion may be one of block, such as the top, left block. Alternatively, the reference portion may be a combination of blocks or portions of the image, or some other portion.

In embodiments, a computer-implemented method for detecting an object of interest in an image comprises obtaining candidate patches, which include image patches from the image. A local difference pattern feature is computed for a candidate patch. The local difference pattern, which may be a vector, is used to associate the candidate patch with a category. Each category has a classifier associated with it, and it is this associated classifier that is applied to the candidate patch to classify whether the object is in the candidate patch.

Embodiments of the present invention include methods that have been encoded upon one or more non-transitory computer-readable media with instructions for one or more processors or processing units to perform. A method may include a plurality of instructions that are executed by one or more processors.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood

DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

1. Background

As previously noted, prior methods for detecting objects within an image using classifiers were limited because these methods focused on detecting the object but did not adequately account for background variations. As a result, the classifiers were effective for certain background types but were less effective for others.

Background variation can be a significant issue because input images are often captured under different conditions, such as different levels of exposure, different ISO settings, different backgrounds, and the like. This is especially apparent when dealing with thermal infrared (IR) images. Infrared images are often used to identify humans because the images are more robust. Infrared images eliminate variations due to clothes, colors, etc. However, one issue with infrared images is that changes in ambient temperature, which can vary significantly within a day and between days, directly affect the background of the IR images. Moreover, the temperature can vary from below normal body temperature to above normal body temperature. Thus, if the camera is set with "auto-exposure," when the background temperature is lower than body temperature, the human figure will be bright and the background dark. When the background temperature is higher than body temperature, the image contrast will be reversed with the human figure being dark and the background light. Finally, when the background temperature is close to normal body temperature, the human figure and background intensities will differ very little, making it more difficult to detect the human images.

Figure 1:
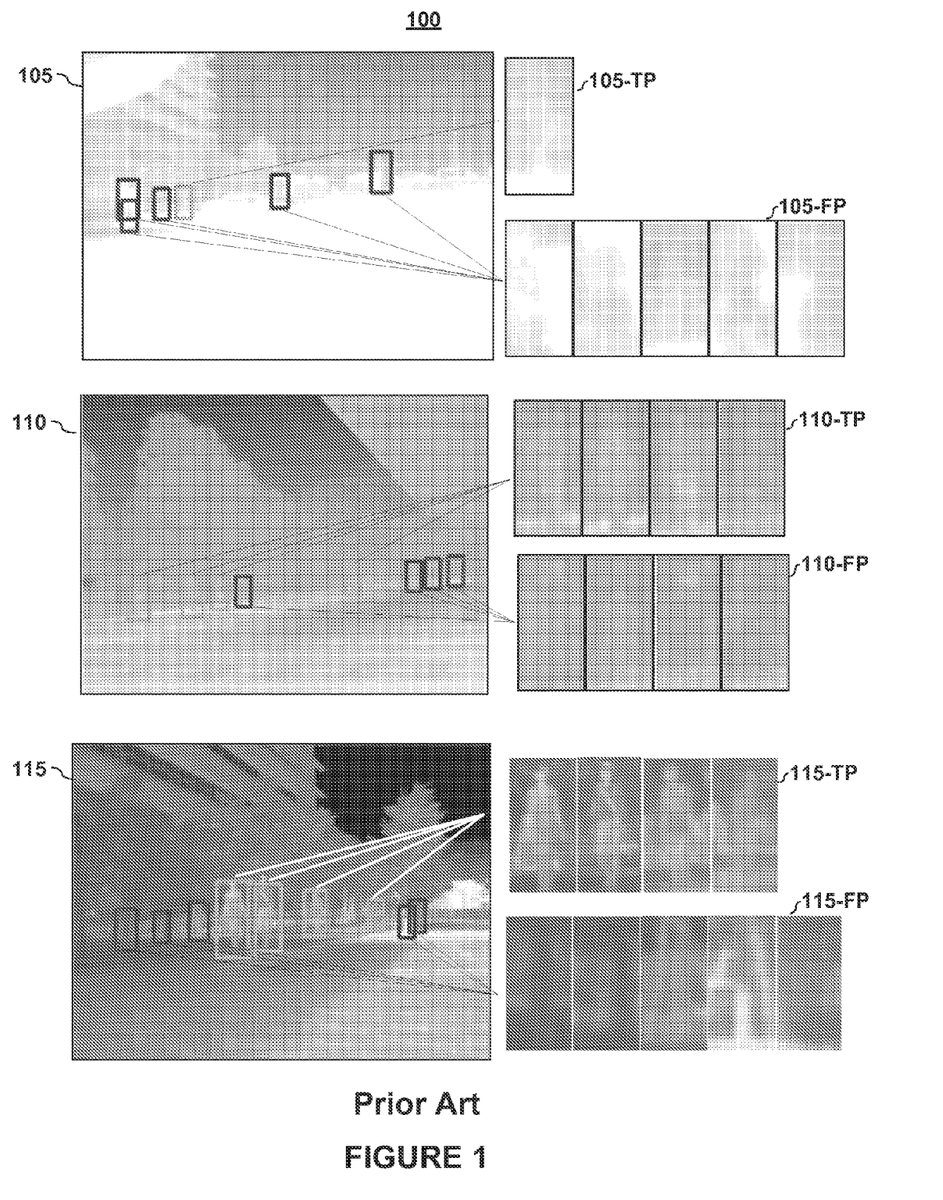
FIG. 1 depicts a set of images with different backgrounds.

FIG. 1 depicts three different infrared images of pedestrians with different levels of contrast due to the background variation. Each row represents a different background type. Image 105 has the lightest background. Image 115 has the overall darkest background, while the background intensity of image 110 is somewhere between that of image 105 and image 115. Using an existing detector, such as AdaBoost, human figures have been detected within each of three images. Within each image, the detector detected some images that are, in fact, human images (true positives) (105-TP, 110-TP, and 115-TP) and some images that are not, in fact, human images (false positives) (105-FP, 110-FP, and 115-FP). Note that the detector has varying levels of success in accurately detecting human images depending upon the background. For example, in image 105, the detector correctly identified only one human figure 105-TP and incorrectly identified five other image patches 105-FP as containing human figures when they did not.

Accordingly, modeling systems and methods can be improved by accounting for variations in background. Thus, embodiments in the present disclosure use background information to differentiate input images into different classes using a local different pattern (LDP) feature. In embodiments, the local different pattern may be used both in training detection systems and in detection systems.

Local Difference Pattern

Figure 2:
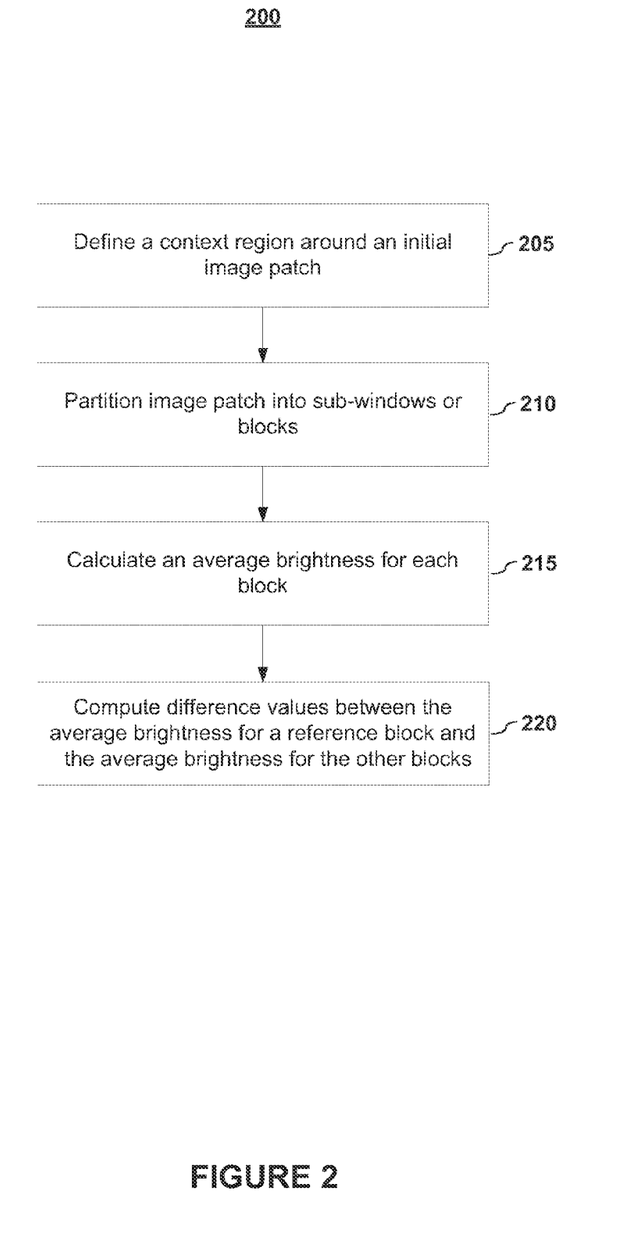
FIG. 2 depicts a local difference pattern methodology according to embodiments of the present invention.
Figure 3:
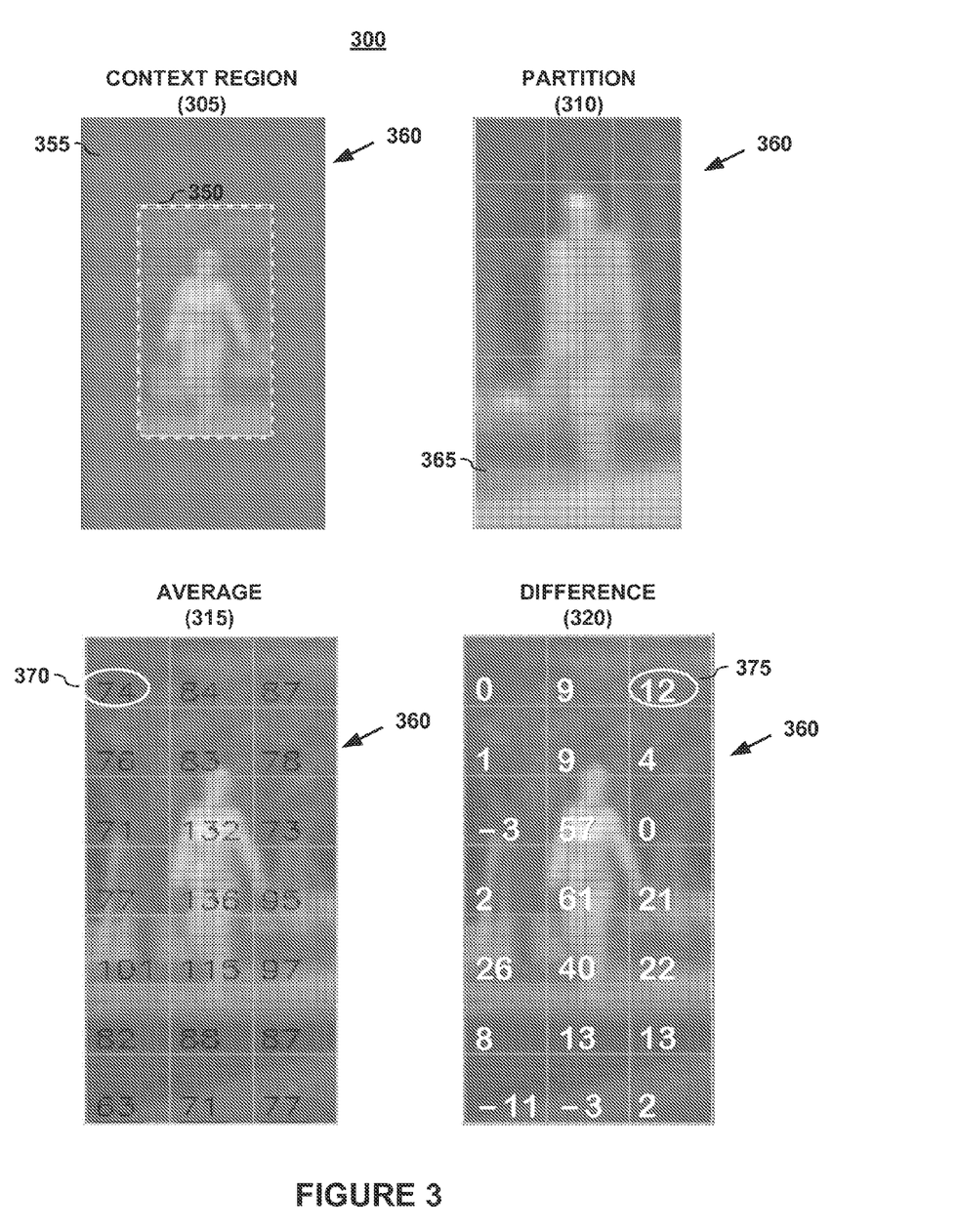
FIG. 3 illustrations different stages of generating a local difference pattern according to embodiments of the present invention.

FIG. 2 depicts a local difference pattern methodology according to embodiments of the present invention. As illustrated in FIG. 2, in embodiments, a scan window image patch (see, e.g., 350 in FIG. 3) is extended (205) to include context region information 355 in the image patch 360. The scan window image patch 350 in FIG. 3 (305) depicts an example of an image patch that may contain an object of interest, which in this example is a human figure. The scan window image patch 350 may be obtained from applying an existing detector, such as AdaBoost or SVM, to an input image to obtain one or more scan window image patches. In embodiments, the initial scan window image patch 350 is expanded to double the size by including context region 355. For example, the length and width of the initial scan window 350 may each be doubled, with the initial image centered in the image patch 305 as shown in FIG. 3. In embodiments, if the initial image scan is at or near an edge of the image so that a full context region cannot be formed from original image pixels, pixels may be added to the missing region. In embodiments, the missing pixels are black, have the same average brightness as a local region, or may have some other configuration. It shall be noted that other context region sizes, shapes, and configurations may be used, including having no additional context region in one or more context region portions or directions.

Returning to FIG. 2, the image patch 360 may be divided (210) into a set of sub-windows or block. It shall be note that the use of the term "set" in this patent document shall include any number of items. In FIG. 3 (310), the image patch 360 is partitioned into a set of 3-by-7 blocks 365, although other numbers of image blocks (such as 9-by-17, by way of illustration and not limitation) and other shapes and configurations may be used.

For each block, an average brightness or intensity for each block is calculated (215). In embodiments, the average may be the mean, median, or mode for the block. FIG. 3 (315) depicts the example image patch 360 with the average intensity values (e.g., value 370) for each of the blocks.

With average intensity values for each of the blocks, a difference value may be computed (220) between the average brightness for a reference block and each of the average brightness values for the other blocks. In embodiments, the reference intensity value may be obtained from the top, left corner block 370. In embodiments, the top, left corner block is selected because it is likely to contain a significant portion of background pixel values for both positive and negative samples. Thus, a top, left corner reference block is more consistent for distinguishing objects, like human figures, from background, which has been confirmed in experiments. One skilled in the art shall recognize that the reference value may be selected from a different block or from a different source, including but not limited to a number of blocks, a different portion of the input image, or a combination thereof. For example, in embodiments, the average of the values of the four corner blocks may be used. One skilled in the art shall recognize that the local difference pattern represents how much contrast exists within an image patch with respect to the reference block. In FIG. 3 (320), the candidate patch 360 is overlaid with the difference values (e.g., value 375) for each block.

One skilled in the art shall recognize that although other pattern methods exist, none are like the local difference pattern presented herein. For example, Local Binary Pattern (LBP) is a well-known pattern methodology in the art of detection. However, it must be noted that there are significant differences. First, LBP does not compute difference values. Rather, it is simply a binary value where greater than a reference is set to "1" and less than the reference is set to "0". Second, LBP is used for detecting objects of interest, not for detecting backgrounds. As a result, it LBP does not include a context region as the LDP does. Third, since the LBP is concerned with detecting the object of interest and not modeling the background, it takes as the reference block the center block because it is more likely to contain the object of interest, which also means it is less likely to contain background pixel values. Other differences will be apparent to one skilled in the art.

Training and Detecting Using Local Difference Pattern Feature

Detection algorithms usually consist of two parts: (1) training, in which classifiers are trained, and (2) classification, which uses the trained classifiers for detection. In embodiments, the local difference pattern may be used in both training a detection model and in detecting the objects of interest in images.

Training Using Local Difference Pattern

Figure 4:
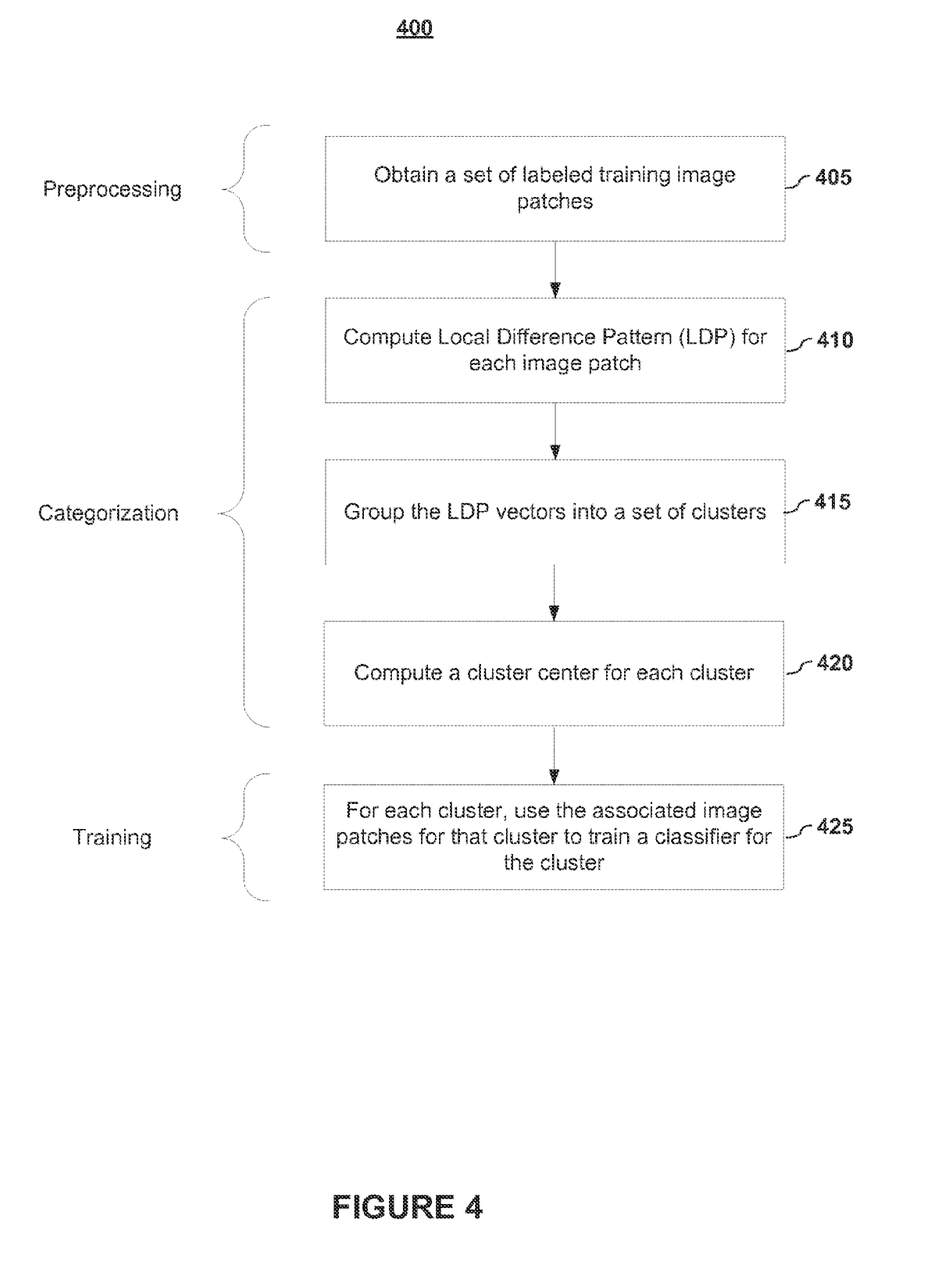
FIG. 4 depicts a process flow for training a detection system that includes local difference pattern according to embodiments of the present invention.

FIG. 4 depicts a process flow for training a detection system using local difference pattern according to embodiments of the present invention. In embodiments, the steps depicted in FIG. 4 may be grouped into three main categories: preprocessing (step 405); categorization (steps 410-420); and training (step 425). It shall be noted that the depicted grouping and categorizations are provided to aid presentation and shall not be used for purposes of limiting the present invention. One skilled in the art shall recognize that other groupings and descriptions may be used.

In embodiments, the preprocessing stage commences by obtaining (405) a set of training image patches, which include labels indicating whether an image patch does or does not include the object of interest. In embodiments, the set of labeled training image patches may be obtained from input images using an existing detector or detectors, such as AdaBoost or SVM, and the ground truth information.

In embodiments, the categorization phase commences by computing (410) a local difference pattern for each image patch. The LDP may be obtained as explained previously with reference to FIGS. 2 and 3. In embodiments, the local difference pattern for an image patch forms a vector comprising the difference values. The local difference pattern vectors are grouped (415) into a set of clusters. In embodiments, the local difference pattern vectors may be grouped using K-means clustering, although it shall be noted that no particular clustering mechanism is critical to the present invention. The number of clusters may be user selected or determined empirically. In embodiments, the grouping may be set at 20 clusters. Once the local difference patterns have been grouped into clusters, a cluster center may be computed (420) for each of the clusters. One skilled in the art shall recognize that each cluster, or category, will represent a different background profile.

In embodiments, the training phase comprises using (425) the image patches associated with a cluster to train a classifier for that cluster or category. In embodiments, the set of labeled images may comprise true positive image patches (image patches that contain the object of interest) and false positive image patches (image patches that do not, in fact, contain the object of interest). Each of these true positive and false positive image patches is associated with a cluster following the categorization phase. These true positive and false positive image samples associated with a cluster are used to train a classifier for that cluster. The set of trained classifiers from the set of clusters may be used to detect objects of interest in subsequent input images.

Detecting Using Local Difference Pattern Feature

Figure 5:
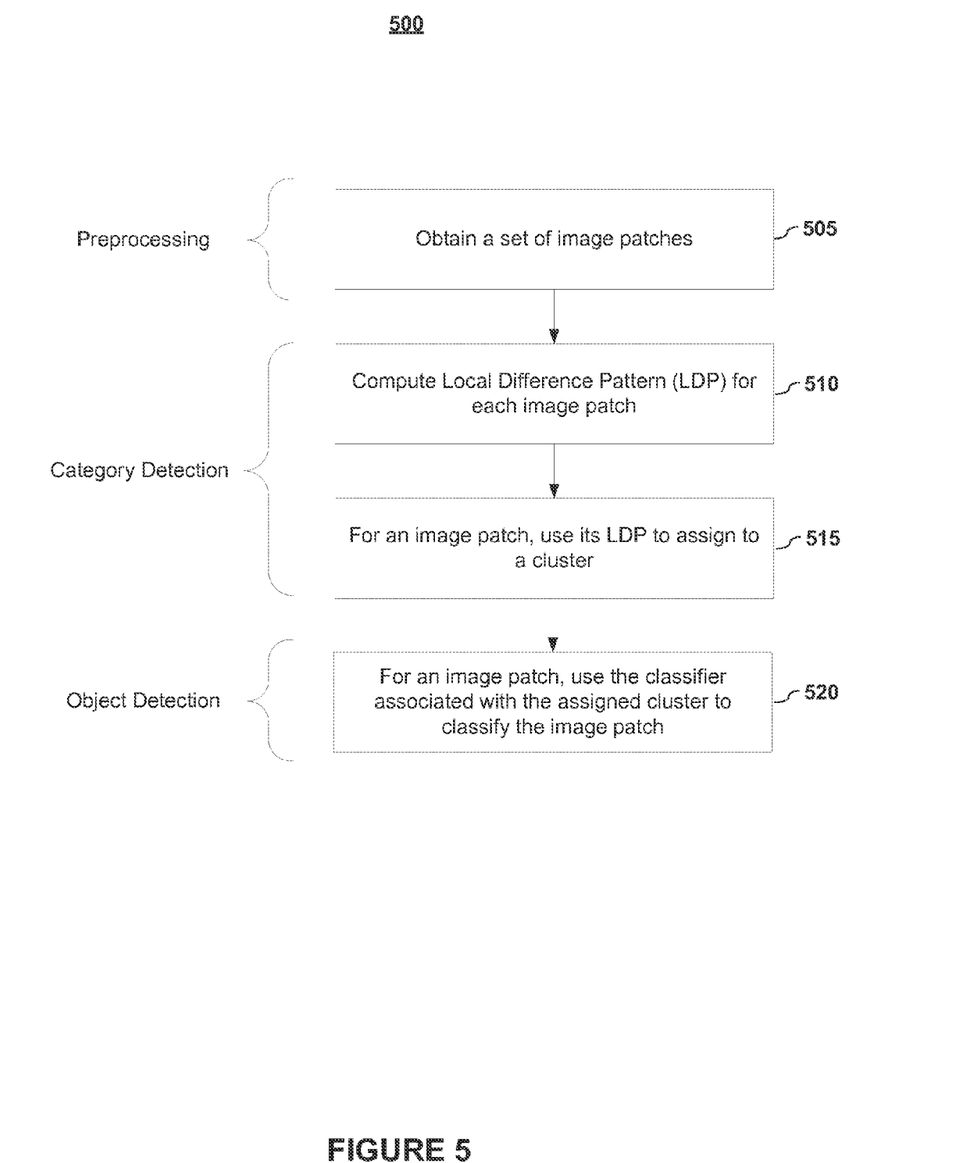
FIG. 5 depicts a process flow for using a detection system that includes local difference pattern according to embodiments of the present invention.

Given trained classifiers, these classifies may be used as part of a detection system to detect objects of interest in images. FIG. 5 depicts a process flow for using a detection system that includes local difference pattern according to embodiments of the present invention. In embodiments, the steps depicted in FIG. 5 may be grouped into three main categories: preprocessing (step 505); category detection (steps 510 and 515); and object detection (step 520). It shall be noted that the depicted grouping and categorizations are provided to aid presentation and shall not be used for purposes of limiting the present invention. One skilled in the art shall recognize that other groupings and descriptions may be used.

In embodiments, the preprocessing stage commences by obtaining (505) one or more image patches. In embodiments, the set of image patches may be obtained from one or more input images using an existing detector or detectors, such as AdaBoost or SVM. In embodiments, the confidence value(s) of the initial detector may be set so that the detected images are over-inclusive, thereby reducing the possibility of excluding true image patches in the initial detection. As a result of being over-inclusive, a large number of false positives will be included; however, the subsequent detection can assist in eliminating these false positives. In embodiments, the image patches may be all scan windows from an input image. It shall be noted that the image patches may be in the form of locations in an image.

Figure 6:
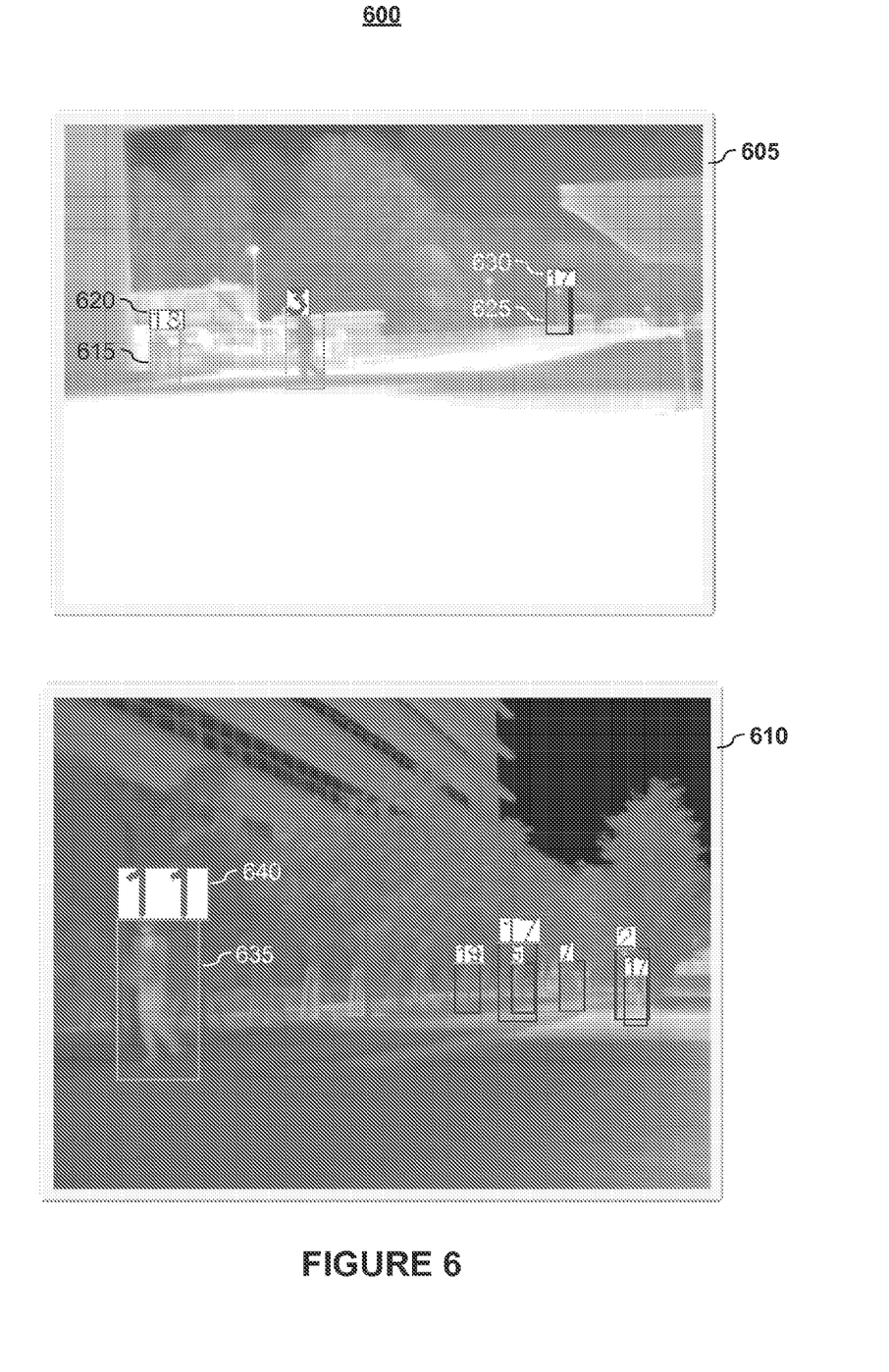
FIG. 6 depicts examples of image patches that have been assigned to clusters using local difference pattern according to embodiments of the present invention.

In embodiments, the category detection phase commences by computing (510) a local difference pattern for each image patch, which can be obtained as explained above with respect to FIGS. 2 and 3. For each image patch, its associated local difference pattern is used (515) to assign it to one of the clusters. In embodiments, an image patch is assigned to a cluster by finding the cluster with the smallest distance between the image patch's local difference pattern vector and the cluster center. FIG. 6 depicts two input images 605 and 610, each of which includes a set of image patches identified during the preprocessing stage. After forming a local difference pattern, each of the patches has been assigned to a cluster. For example, image patch 615 has been assigned to cluster 18 (620), image patch 625 has been assigned to cluster 17 (630), and image patch 635 was assigned to cluster 11 (640), and each cluster has its own associated classifier that will be used in objection detection.

In embodiments, the object detection phase comprises using (520) the classifier that has been associated with each image patch to perform the final classification. For example, the classifier associated with cluster 18 will be used in object detection for image patch 615 in image 605. Likewise, the classifier associated with cluster 11 will be used in object detection for image patch 635 in image 610, and so forth. Thus, the object detection of the current application can allow for differences in background, even within an image, to improve the object detection rate.

Figure 7:
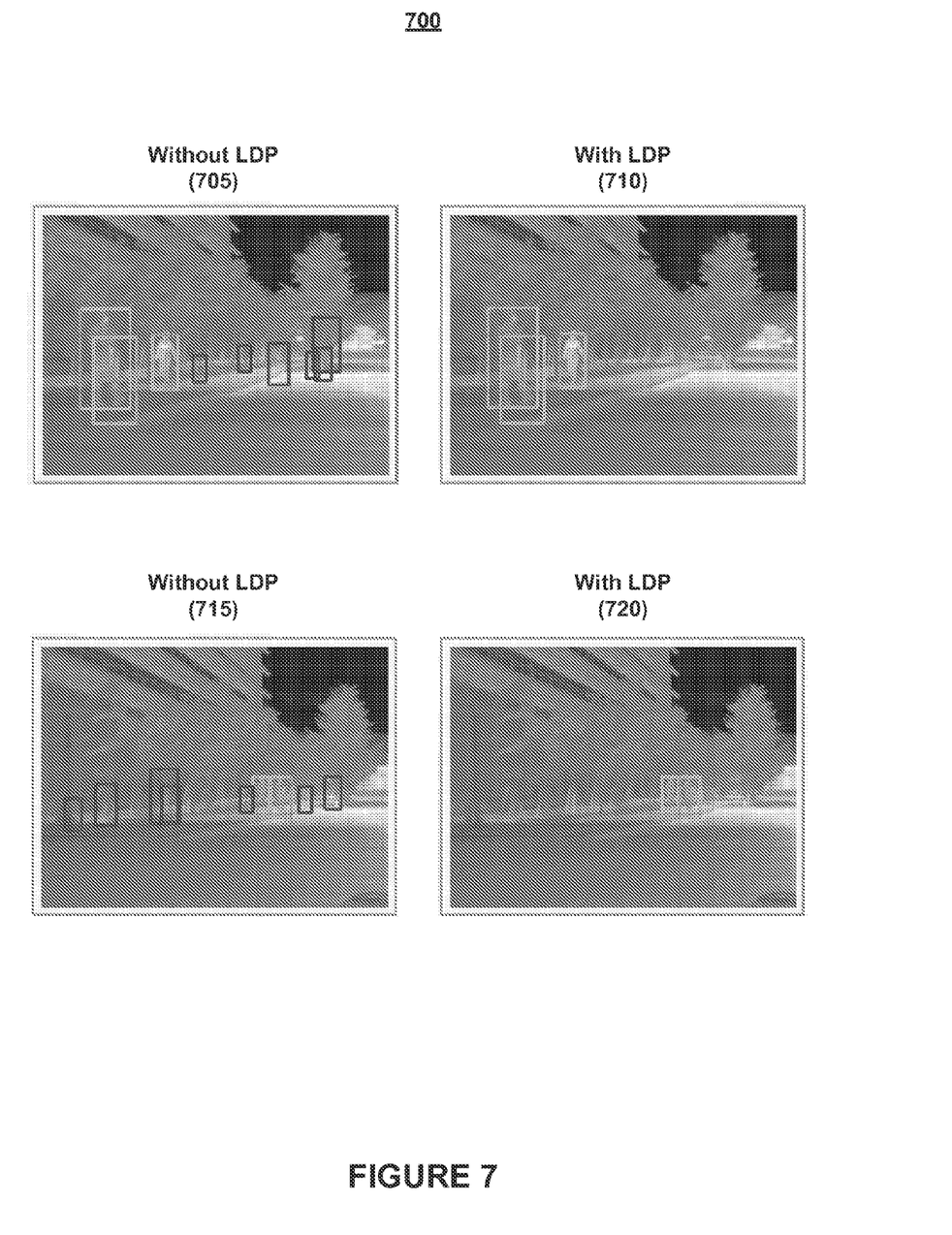
FIG. 7 depicts sample object detection results that show improved object detection when local difference pattern is used according to embodiments of the present invention.

FIG. 7 depicts sample object detection results that show improved object detection when local difference pattern is used according to embodiments of the present invention. Two sets of images (705, 710 and 715, 720) are shown in FIG. 7. The images in the left-hand column (705 and 715) have had object detection using detection that did not employ local difference pattern. Note that the detection without the local difference pattern detected many more image patches, including many false positive detections. In contrast, the images in the right-hand column (710 and 720) show the results of object detection that used local difference pattern. Note that in the images (710 and 720), the objects of interest (in this case human figures) were correctly identified, as well as having no false positives.

System Embodiments

Figure 8:
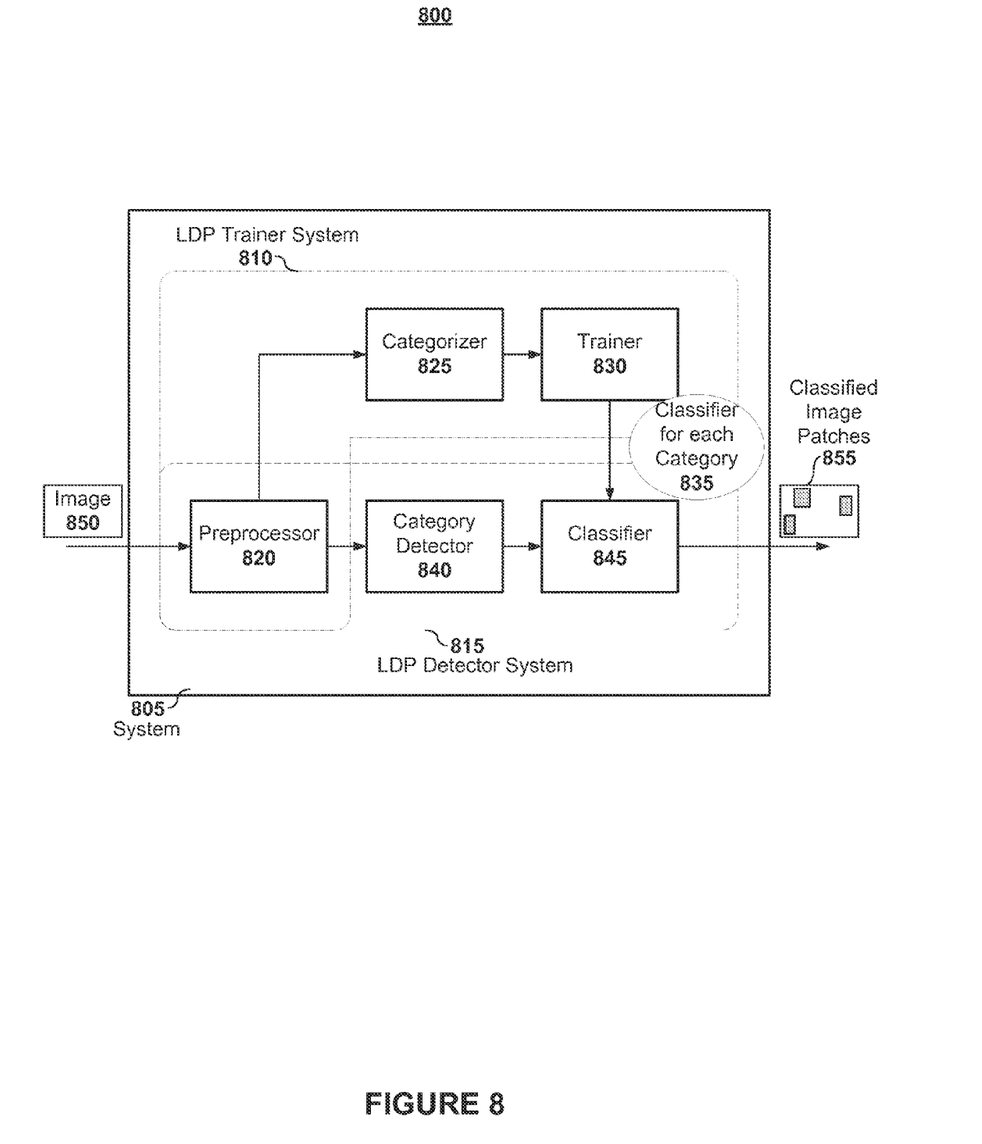
FIG. 8 depicts a local-difference-pattern trainer-detector system according to embodiments of the present invention.

FIG. 8 depicts a local difference pattern feature trainer-detector system according to embodiments of the present invention. The system 805 comprises an LDP trainer system 810 and an LDP feature-enabled detector system 815. In the depicted embodiment, the LDP trainer system 810 and an LDP feature-enabled detector system 815 are part of the same overall system 805. However, it shall be noted that these systems (810 and 815) may be separate. One skilled in the art shall recognize that other system configurations may be used to perform LDP training and classification using LDP. In embodiments, system 805, 810, and/or 815 may be implemented using a computing system, such as one described with reference to FIG. 9, which is discussed below.

In embodiments, LDP trainer system 810 performs the methods described with reference to FIG. 4. Accordingly, the preprocessor 820 performs the preprocessing steps (step 410). Categorizer 825 performs the categorization steps (410-420). And, the trainer 830 performs the training (step 425). As a result, a set of categories with a classifier for each category 835 is provided to the LDP feature-enabled detector system 815 for classification of image patches.

In embodiments, the LDP feature-enabled detector system 815 performs the methods described with reference to FIG. 5. Accordingly, the preprocessor 820 performs the preprocessing steps (step 510). Category detector 840 performs the category detection steps (510 and 515). And, the classifier 845 performs the final classification step (step 520) by choosing the classifier corresponding to an identified category to classify an image patch.

Figure 9:
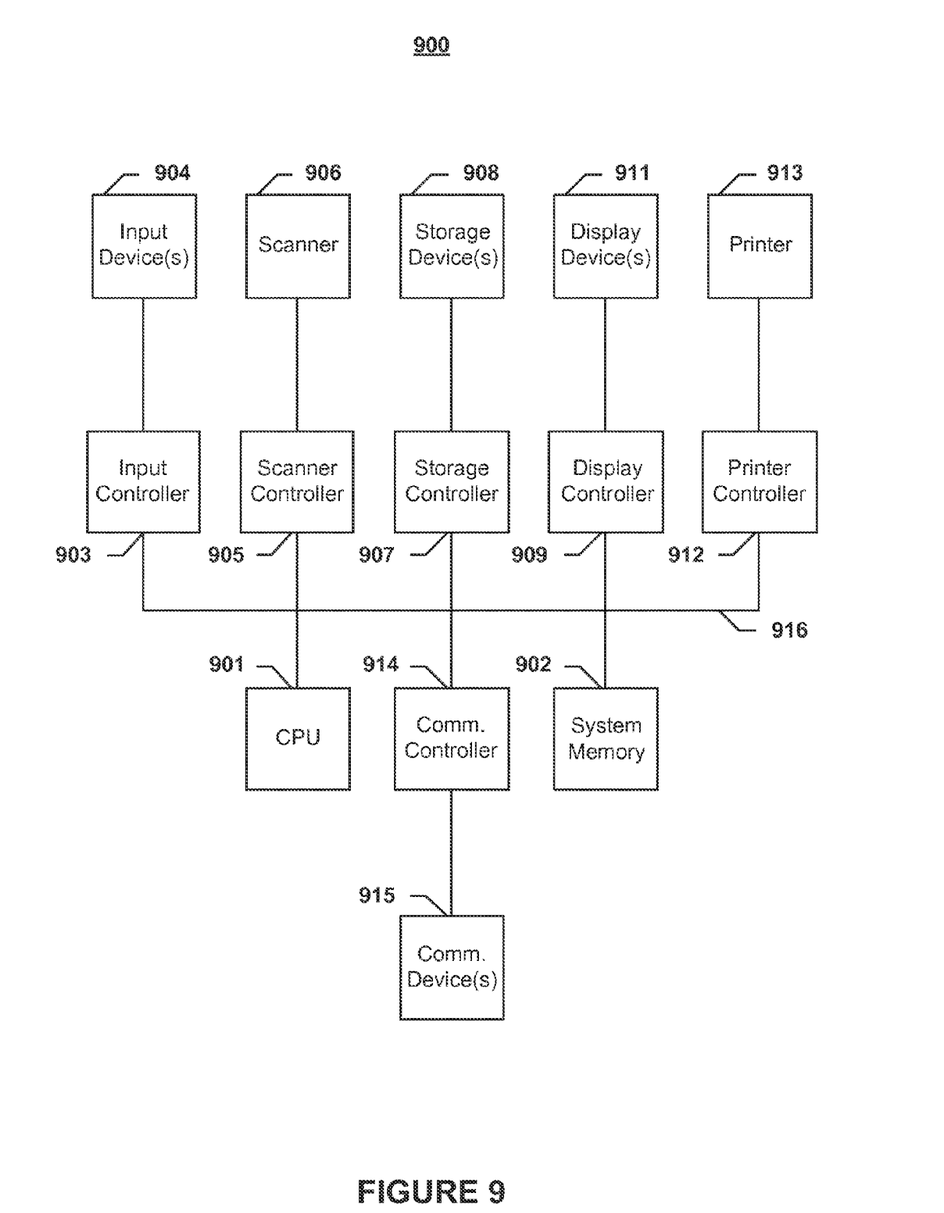
FIG. 9 is a block diagram illustrating an exemplary system which may be used to implement aspects of the present invention.

Having described the details of the invention, an exemplary system 900, which may be used to implement one or more aspects of the present invention, will now be described with reference to FIG. 9. As illustrated in FIG. 9, the system includes a central processing unit (CPU) 901 that provides computing resources and controls the computer. The CPU 901 may be implemented with a microprocessor or the like, and may also include a graphics processor and/or a floating point coprocessor for mathematical computations. The system 900 may also include system memory 902, which may be in the form of random-access memory (RAM) and read-only memory (ROM).

A number of controllers and peripheral devices may also be provided, as shown in FIG. 9. An input controller 903 represents an interface to various input device(s) 904, such as a keyboard, mouse, or stylus. There may also be a scanner controller 905, which communicates with a scanner 906. The system 900 may also include a storage controller 907 for interfacing with one or more storage devices 908 each of which includes a storage medium such as magnetic tape or disk, or an optical medium that might be used to record programs of instructions for operating systems, utilities and applications which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, or other type of display. The system 900 may also include a printer controller 912 for communicating with a printer 913. A communications controller 914 may interface with one or more communication devices 915, which enables the system 900 to connect to remote devices through any of a variety of networks including the Internet, a local area network (LAN), a wide area network (WAN), or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware. In embodiments, one or more of the methods may be implemented using one or more processing units/systems.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A computer-implemented method for detecting an object of interest in an image, the method comprising:
    obtaining candidate patches that may contain the object, the candidate patches comprising image patches from the image; and
    for each candidate patch from a set of candidate patches selected from the candidate patches:
        computing a local difference pattern feature;
        using the local difference pattern feature to associate the candidate patch with a category from a set of categories, each category having a different background profile and a classifier associated with the category; and
        applying the classifier of the category to which the candidate patch is associated to classify whether the object is in the candidate patch.

2. The computer-implemented method of claim 1 wherein the step of computing a local difference pattern feature comprises:
    partitioning the candidate patch into blocks;
    calculating a brightness value for a reference portion;
    calculating a brightness value for at least some of the blocks; and
    computing a difference value between the brightness of the reference portion and the brightness of at least some of the blocks.

3. The computer-implemented method of claim 2 wherein:
    the candidate patch comprises an image patch from the image and context region that is at least partially from the image.

4. The computer-implemented method of claim 2 wherein the brightness value is an average brightness of a block.

5. The computer-implemented method of claim 2 wherein the reference portion is selected to increase likelihood of the reference portion comprising image background.

6. The computer-implemented method of claim 2 wherein the reference portion is a top left block in the candidate patch.

7. The computer-implemented method of claim 1 wherein a category comprises a cluster of local difference pattern features and the set of categories comprises a set of clusters.

8. The computer-implemented method of claim 7 wherein the step of using the local difference pattern feature to associate the candidate patch with a category from a set of categories comprises:
    identifying a cluster from the set of clusters that has a smallest distance between the local difference pattern feature of the candidate patch and a cluster center for the cluster; and
    associating the candidate patch with that cluster.

9. A computer-implemented method for training a detection system for detecting an object in an image, the method comprising:
    obtaining image patches with associate labels, wherein a label indicates whether or not its associated image patch contains the object;
    for each image patch from a set of image patches selected from the labeled image patches, computing a local difference pattern feature;
    clustering the local difference pattern features into a set of clusters using the local difference pattern features; and
    for each cluster, using the image patches associated with the cluster and the labels associated with those image patches to train a classifier for that cluster.

10. The computer-implemented method of claim 9 wherein the step of obtaining labeled image patches comprises:
    using a detector to identify image patches in an image; and
    using ground truth information to label the image patches.

11. The computer-implemented method of claim 9 wherein the step of, for each image patch from a set of image patches selected from the labeled image patches, computing a local difference pattern feature comprises:
    partitioning a candidate patch comprising the image patch into blocks;
    calculating a brightness value for a reference portion;
    calculating a brightness value for at least some of the blocks; and
    computing a difference value between the brightness of the reference portion and the brightness of at least some of the blocks.

12. The computer-implemented method of claim 11 further comprising:
    including a context region of the image patch with the candidate patch.

13. The computer-implemented method of claim 11 wherein the brightness value is an average brightness.

14. The computer-implemented method of claim 11 wherein the reference portion is selected to increase likelihood of the reference portion comprising image background.

15. The computer-implemented method of claim 11 wherein the reference portion is a top left block in the candidate patch.

16. A non-transitory computer-readable medium containing one or more sequences of instructions which, when executed by one or more processors, causes the one or more processors to perform the method of claim 9.

17. A non-transitory computer-readable medium containing one or more sets of instructions which, when executed by one or more processors, causes the one or more processors to perform a method for detecting an object in an image comprising:
- using a detector to identify candidate patches in the image that may contain the item; and
- for each candidate patch from a set of candidate patches selected from the identified candidate patches:
  - computing a local difference pattern;
  - using the local difference pattern to associate the candidate patch with a category from a set of categories, each category having a classifier associated with it; and
  - applying the classifier of the category to which the candidate patch is associated to classify whether the object is in the candidate patch.

18. The non-transitory computer-readable medium of claim 17 wherein the step of computing a local difference pattern comprises:
- extending the candidate patch to include context region from the image;
- partitioning the candidate patch into blocks;
- calculating a brightness value for a reference portion;
- calculating a brightness value for at least some of the blocks; and
- computing a difference value between the brightness of the reference portion and the brightness of at least some of the blocks.

19. The non-transitory computer-readable medium of claim 18 wherein the brightness value is an average brightness.

20. The non-transitory computer-readable medium of claim 17 wherein the step of using the local difference pattern to associate the candidate patch with a category from a set of categories comprises:
- identifying a category from the set of categories that has a smallest distance between the local difference pattern of the candidate patch and the category; and
- associating the candidate patch with that category.

* * * * *